United States Patent [19]

Starkey

[11] Patent Number: 5,316,467

[45] Date of Patent: * May 31, 1994

[54] INTERNAL CORE LIFTER APPARATUS WITH MULTIPLE AXIS COMPENSATION FEATURE

[75] Inventor: Glenn Starkey, Lindenhurst, Ill.

[73] Assignee: D & L Incorporated, Wauconda, Ill.

[*] Notice: The portion of the term of this patent subsequent to Aug. 11, 2009 has been disclaimed.

[21] Appl. No.: 898,807

[22] Filed: Jun. 15, 1992

Related U.S. Application Data

[63] Continuation-in-part of Ser. No. 652,094, Feb. 7, 1991, Pat. No. 5,137,442.

[51] Int. Cl.$^5$ ............................................. B29C 45/44
[52] U.S. Cl. ................... 425/438; 249/66.1; 425/441; 425/444; 425/556; 425/577; 425/DIG. 58
[58] Field of Search ............... 425/441, 554, 438, 444, 425/556, 577, DIG. 58; 249/66.1, 74

[56] References Cited

U.S. PATENT DOCUMENTS

| | | | |
|---|---|---|---|
| 3,293,697 | 12/1966 | Balint | 425/441 |
| 3,387,334 | 6/1968 | Belanger et al. | 425/441 X |
| 3,454,693 | 7/1969 | Crenshaw | 425/DIG. 58 |
| 4,101,256 | 7/1978 | White et al. | 425/DIG. 58 |
| 4,854,849 | 8/1989 | Sudo | 425/556 |
| 4,956,142 | 9/1990 | Mangone, Jr. | 425/577 X |
| 5,137,442 | 8/1992 | Starkey | 425/438 |

FOREIGN PATENT DOCUMENTS 55-152034 11/1980 Japan ....................... 425/441

Primary Examiner—Richard L. Chiesa
Attorney, Agent, or Firm—Fitch, Even, Tabin & Flannery

[57] ABSTRACT

In accordance with the present invention there is provided a new and improved internal core lifter for molding and ejecting plastic parts having undercuts. The preferred internal core lifter has a core blade with a first end configured to cooperate with the surfaces of the mold for molding a plastic part and for assisting in safe ejection of the plastic part. The core blade may be pivotally mounted at an opposite end for being disposed at a predetermined molding angle in a range of angles for accommodating various molding angles of mold apparatus. In ejecting the plastic part, the first end of the core blade moves horizontally away from the undercut while moving vertical to assist in safe ejection of the plastic part. The coupling may pivotally mount the core blade's opposite end for pivoting about multiple axes, and a support may be provided for mounting the coupling to the mold apparatus to move the opposite end of the core blade as the mold apparatus shifts its mold halves between open and closed positions. The core blade may pivot about the coupling in a first plane aligned with the linear travel of the lower end of the core blade along the support; and, if transverse loads are applied to the core blade, the core blade may also pivot in a plane at an angle to the first plane to prevent binding of the core blade and coupling relative to the support.

9 Claims, 3 Drawing Sheets

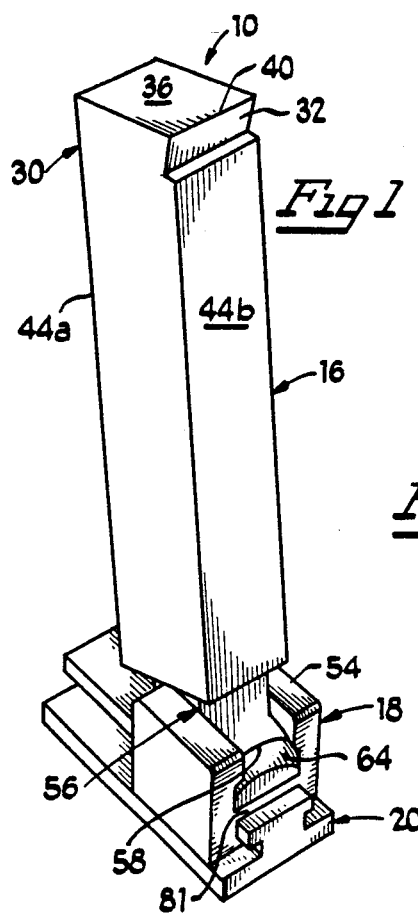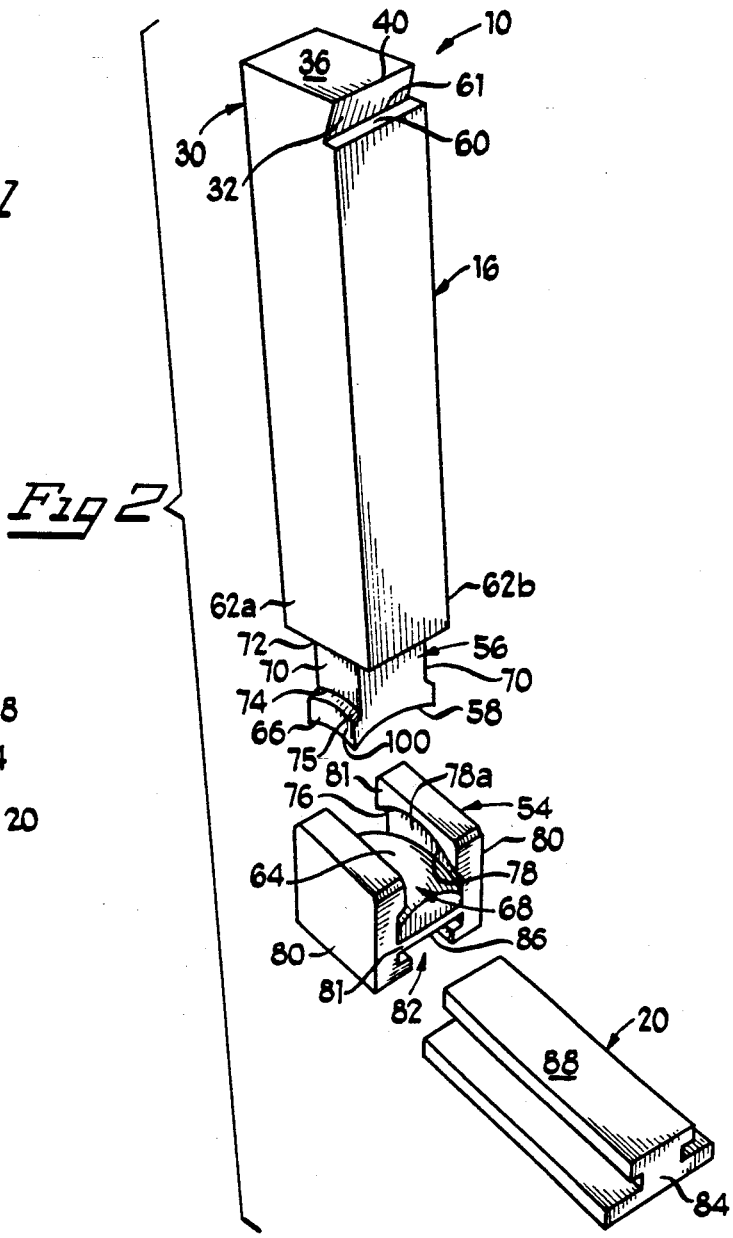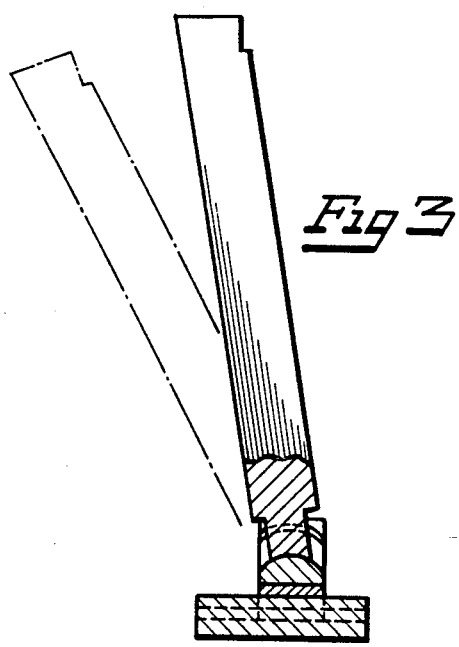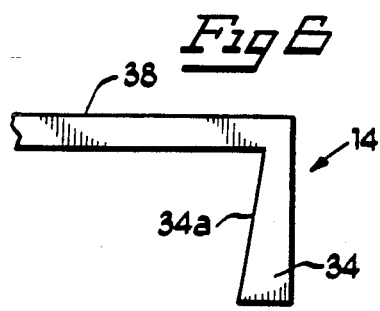

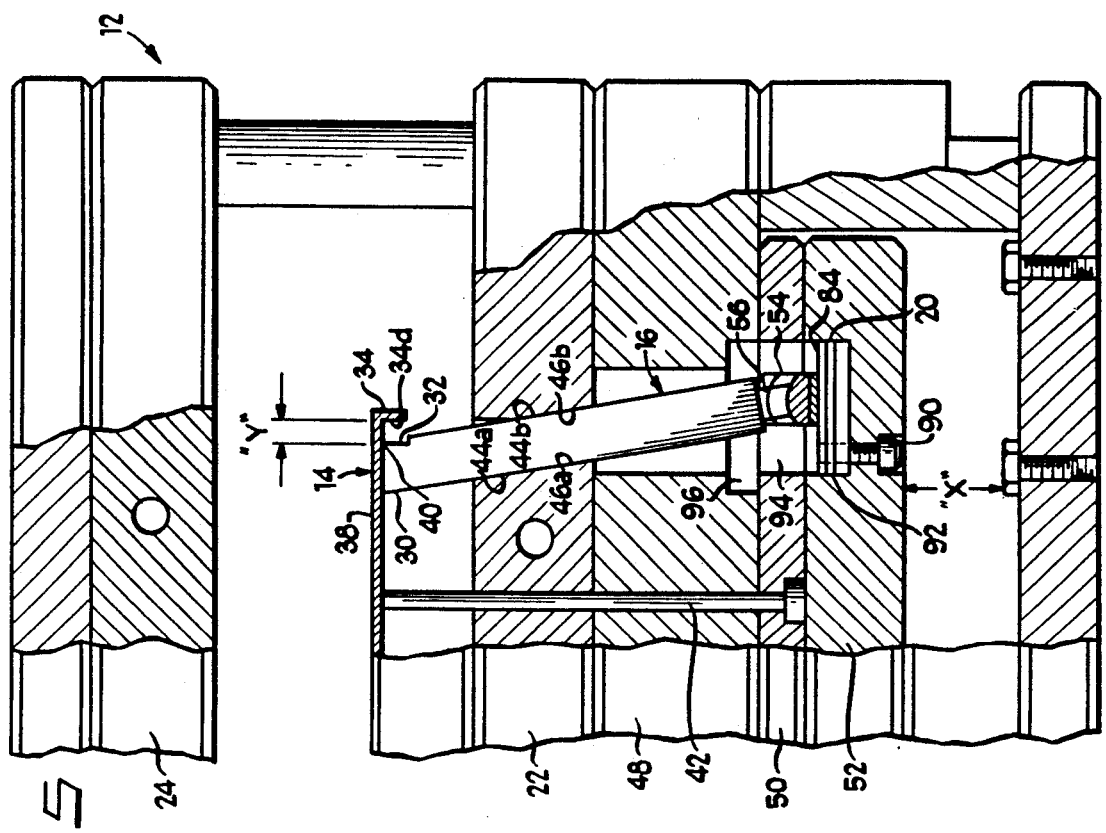
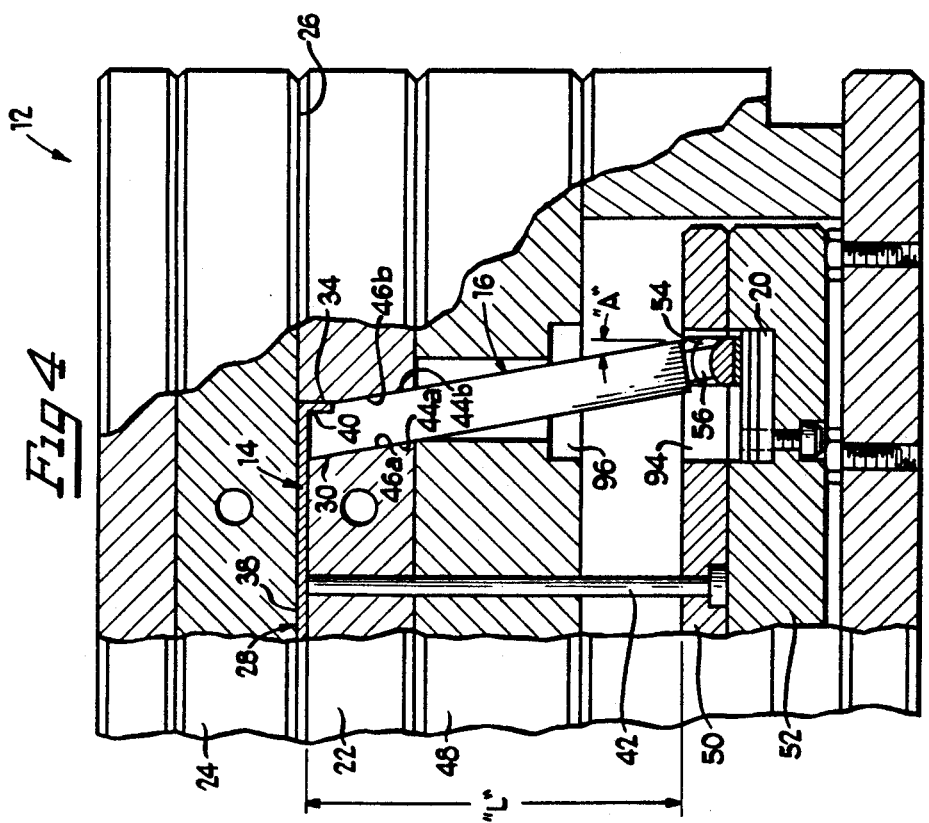

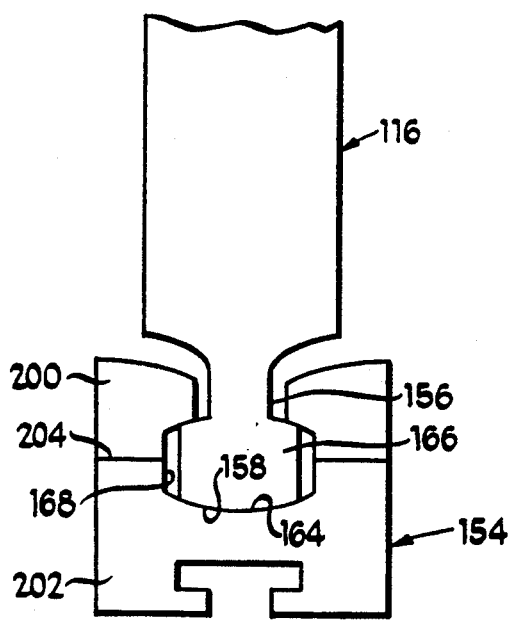
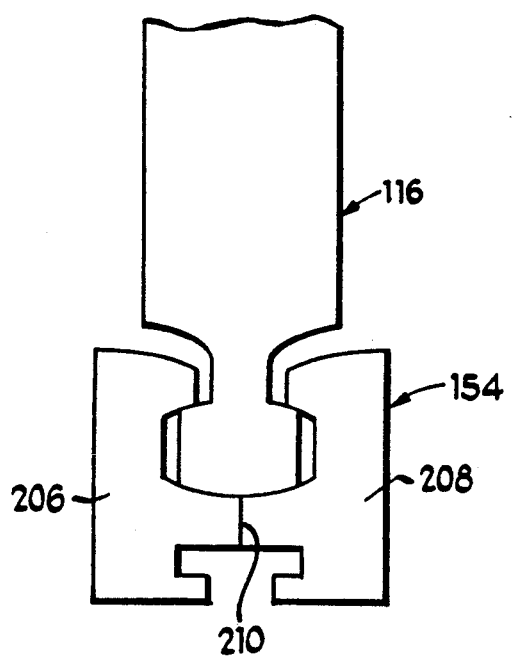

INTERNAL CORE LIFTER APPARATUS WITH MULTIPLE AXIS COMPENSATION FEATURE

This application is a continuation-in-part application of Ser. No. 652,094, filed Feb. 7, 1991, entitled "Universal Internal Core Lifter Apparatus", now U.S. Pat. No. 5,137,442.

FIELD OF THE INVENTION

The present invention is directed to providing an internal core lifter to replace the usual custom made core lifter, and more particularly, to an improved universal core lifter which pivots about multiple axes to prevent failure and damage.

BACKGROUND OF THE INVENTION

A wide variety of internal core lifters have been developed for use within a plastic injection mold apparatus to mold and eject plastic parts with undercuts. Most of these internal core lifters generally consist of a core blade with one end permanently mounted at a predetermined molding angle to a coupling. The coupling then slides linearly along a support mounted to the mold apparatus' ejection plate to enable the core blade to remain at the molding angle. Because the core blade is permanently attached to the coupling, these lifters commonly need to be custom designed to fit particular molds on a case by case basis.

In the plastic injection molding of plastic parts with undercuts, it is common for the molding apparatus to include an internal core lifter which when the mold is closed assists in molding the part and when the mold is opened assists in ejecting the part. The internal core lifter generally consists of a core blade with a first end designed to be incorporated in the mold cavity to mold and eject the plastic part, and an opposite end mounted to a coupling which enables the blade to pivot in a pivot plane about a single axis and translate linearly along a support normal to the pivot axis. In order for the core blade to assist in vertical ejection without damaging the undercut of the plastic part, it is commonly disposed and maintained in the molding apparatus at a mold specific molding angle, and as the mold opens, the core blade support is raised compelling the blade to move along the support, to maintain the molding angle, as its upper end moves away from the undercut to safely eject the plastic part.

The aforementioned co-pending patent application discloses a very advantageous and effective core lifter designed to readily sit at a range of molding angles in which a mold maker would desire. This core lifter substantially reduces the number of custom core lifter designs and alternative inventories because it can be cut to a desired length and can be mounted to a desired molding angle within a range desirable angles. In order to facilitate both the molding angle and horizontal travel, this core lifter has its core blade mounted at the end opposite the end configured for molding and ejecting the plastic part to a universal coupling. The universal coupling has a surface for pivotally mounting the core blade with its cooperating surface. The universal coupling also provides a surface for translating along a support in the plane which the blade may pivot for the molding angle. Thus, this core lifter effectively positions itself relatively easy to any angle in the two dimension plane needed for the molding angle and, thereby, lessening the need for costly mold apparatus particular core lifters.

The molds of molding apparatus are opened and closed with tremendous operating loads and the core lifters are subject to such loads. These operating loads are necessary to successfully open, close and seal the mold cavity and to raise and lower the core lifter and ejection means to properly and safely eject the plastic part. The core lifter disclosed in the aforementioned co-pending patent application has its core blade positioned at a given molding angle in each molding apparatus. The core blade pivots by having a curved dovetail heel at its lower end received in a curved dovetail in a universal coupling. The universal coupling travels linearly by sliding along a linear dovetail of a support. In some instances due to wear or other tolerances or load applications to the mold, the core blade may tend to cock or otherwise turn the connected universal coupling relative to the linear dovetail causing a binding of the universal coupling against its free sliding along the linear dovetail of the support. If the universal coupling should not slide along the linear dovetail of the support, the core blade then may not be raised or lowered properly during the opening and closing of the mold apparatus and, as a result, may be crushed by the mold halves causing severe damage to the core lifter and the molding apparatus.

As regards to damaging the core lifter, the core blade may deflect and, eventually, may be crushed, and because it is commonly made of metal, it may rupture in metal pieces. Because molding operations are fast, there generally is not enough warning to shut down the molding apparatus before preventing damage. The metal pieces may float freely about the molding apparatus, including the molding cavity, and cause severe scoring damage to the mold cavity, and operating surfaces of the mold apparatus and the core lifter itself. It is thus desirable to provide a core lifter having a design which takes into consideration the operating loads generated and transferred to core lifter from any direction for increasing the durability, lifetime and performance of a core lifter.

The present invention is directed toward a new and improved universal internal core lifter that allows the core blade to pivot about multiple axes to compensate for mold operating loads from any direction and, thus, preventing the core blade from twisting the universal coupling about the support which may result in severe damage.

A further object is to provide a universal internal core lifter that may be easily made to a predetermined mold apparatus length and that may easily pivot to a predetermined molding angle in a range of molding angles.

A further object is to have a universal internal core lifter that is highly durable and efficient to manufacture and use. These and other objects will become apparent from the following detailed description and the appended claims.

SUMMARY OF THE INVENTION

In accordance with the present invention there is provided a new and improved universal internal core lifter for molding and ejecting plastic parts having undercuts. The internal core lifter may be used in a mold having a first mold half and a second mold half which each have surfaces defining a mold cavity. The mold halves are movable between a closed position for molding the plastic part and an open position in which the mold halves are spaced for ejecting the plastic part.

The preferred universal internal core lifter may comprise a core blade having a first end configured to cooperate with the surfaces of the first and second mold halves for molding the plastic part and to assist in safely ejecting the plastic part. The core blade may be pivotally mounted at an opposite end for being disposed at a predetermined molding angle to the vertical in each different mold. In ejecting the plastic part, the first end of the core blade moves horizontally away from the undercut while moving vertical to assist in safely ejecting the plastic part.

More specifically, the universal internal core lifter may have a coupling for pivotally mounting the opposite end of the core blade for pivoting about multiple axes, including in a first plane for being disposed at the predetermined molding angle. The core blade and the universal coupling may have a curved dovetail connection in which curved dovetail surfaces on the core blade and universal coupling are interengaged for pivoting about multiple axes to compensate for mold operating loads transverse to the first plane. A support may be provided for mounting the coupling to the mold and for mounting the coupling for linear travel to move the opposite end of the core blade along the support as the mold halves shift between open and closed positions. The support and the universal coupling may have a linear dovetail connection in which flat surfaces on the support and the universal coupling are interengaged for the universal coupling to travel along the support. The core blade maintains the molding angle for lateral movement of the first end away from the plastic part by being able to travel linearly along the support. This multiple axes pivoting prevents the core blade from twisting the coupling about the support and, hence allows it to freely travel along the support.

BRIEF DESCRIPTION OF THE DRAWINGS

The present invention will be described in connection with the accompanying drawings, which illustrate the preferred embodiments of the invention, and in which:

FIG. 1 is a perspective view of an universal internal core lifter embodying various features of the present invention;

FIG. 2 is an exploded perspective view of the lifter in FIG. 1;

FIG. 3 is a partial cross-sectional view taken from the left hand side of the lifter depicted in FIG. 1;

FIG. 4 is a cross-sectional view of a mold apparatus in a closed position employing the lifter of FIG. 1;

FIG. 5 is a cross-sectional view of the mold apparatus shown in FIG. 4 in an open position;

FIG. 6 is an enlarged elevational view of an undercut of a molded plastic part;

FIG. 7 is an elevational view of an alternative universal internal core lifter embodying various features of the present invention; and FIG. 8 is an elevational view of another alternative universal internal core lifter embodying various features of the present invention.

DETAILED DESCRIPTION OF THE PREFERRED EMBODIMENT

As shown in the drawings for purposes of illustration, the invention is preferably embodied in a universal internal core lifter 10 for molding and ejecting plastic parts. The internal core lifter 10, as shown in FIG. 1, is used in a mold apparatus 12 (FIGS. 4 and 5) to mold features of a plastic part 14 (FIG. 6) when the mold apparatus 12 is closed, as shown in FIG. 4, and to eject the plastic part 14 when the mold apparatus 12 is opened, as shown in FIG. 5.

As further shown in FIGS. 4 and 5, the internal core lifter 10 is used in the mold apparatus 12 comprising generally a lower core plate 22 and an upper cavity plate 24. When the mold apparatus 12 is closed, these plates 22 and 24 meet along a parting line 26 and form an internal cavity 28 from internal, exposed surfaces of the plates 22 and 24. The internal cavity 28 is in communication with a plastic injection port (not shown) through which molten plastic at very high pressure is injected into the internal cavity 28.

Turning now to FIG. 1, the internal core lifter 10 comprises generally a core blade 16, a molding angle junction 18 and a support 20. An upper end 30 of the core blade 16 has an angled, vertical surface 32 configured for molding and, in this instance, for molding the plastic part 14 (FIG. 6) with an undercut 34, being a depending lip or flange, and a top surface 36 for molding an adjacent portion 38 on the plastic part 14. The undercut 34 (FIG. 6) may extend downwardly and inwardly along surface 34a at a small angle to the vertical to provide, for example, an integral snap flange, lock or catch member. Because of the unique downward and inward extending undercut 34, the plastic part 14 can not simply be ejected in the vertical direction from the internal cavity 28. An edge 40 on the core blade 16 obstructs a direct vertical release of the undercut 34, and hence, the edge 40 needs to be moved inwardly away from the undercut 34, as shown in FIG. 5. This inward movement releases the undercut 34 and allows ejector pins 42 and the core blade 16 to safely eject the plastic part 14.

Turning again to FIGS. 4 and 5, the core blade 16 is inclined at a molding angle "A" to the vertical. To maintain this angle, the core plate 22 has a first and second surface 46a and 46b to guide the core blade 16 on its back side along a surface 44a and on its front side along a surface 44b, respectively. The molding angle "A" may be varied between different mold apparatus depending on the particular configuration of each plastic part 14, and the distance that the upper end 30 must travel to move edge 40 away from the undercut 34 for safe ejection.

Additionally, various mold apparatus have different thicknesses for their respective lower core plate 22 and core support plate 48 and, also, have different travel distances for their pin retainer plate 50. The pin retainer plate 50 travels upward from the mold's closed position (FIG. 4) to the mold's open position (FIG. 5). In this connection, typical core lifters have lengths in the range of 8 in. to 14 in. and have various cross-sections or diameters, for example ½"×½"; ½"×1"; ¾"×1"; and ¼" diameter. The vertical travel of the retainer plate 50 and the horizontal travel of the core blade's upper end 30 manifest that the core blade 16 length may vary between mold apparatus. Because of these various molding angles, core blade lengths and cross-sectional dimensions and necessary displacements, historically, a new core lifter was custom manufactured to fit each different mold apparatus.

Further known is that the mold apparatus 12 closes to mold and opens to eject plastic parts with tremendous operating loads. More particularly when ejecting, an ejector plate 52 moves upward raising the pin retainer plate 50 which forces upward the ejector pins 42 and the core lifter 10 to eject the plastic part 14. As the core lifter 10 is raised, the core blade 16 travels linearly along the support 20 to remain at the molding angle "A" which directs the upper end 30 away from the undercut 34, by camming the front and back surfaces 44a and 44b against the core plate guide surfaces 46a and 46b. Once the plastic part 14 is ejected, the mold closes, and the core lifter 10 is lowered to its molding position.

It is found that the operating loads may transfer to the core blade 16 an cause severe damage. For example, when the mold apparatus plates 22 and 24 and other mold apparatus components may not be exactly aligned or some mold components may shift slightly or some wear may occur such that the loads being applied by the mold apparatus to the core lifter 10 tend to bend or deflect the core blade 16 and place loads on the lower end 56 of the core blade 16 that may tend to cock a universal coupling 54 and with the universal coupling's dovetail connection with the support, it is not able to slide on the support 20. Once the lower end 56 of the core lifter 10 fails to slide, the core blade 16 is unable to move, and the vertical moving mold surface of the upper cavity plate 24 may begin to bend, break or crush the core blade 16 and damage other components of the mold apparatus. In most instances, any such bending or deflecting loads applied to the core blade 16 tend to pivot it in a first plane that, also, includes the direction of the linear sliding of the universal coupling along the support 20. However, the construction disclosed in the aforementioned patent application does not compensate for potential, large bending loads at other directions including bending loads transverse to the first pivoting plane. Such transverse bending loads will also tend to turn or cock the core blade 16 relative to the universal coupling 54 and/or the support 20 such that there is no free pivoting between the core blade 16 and the universal coupling 54 and no linear sliding of the universal coupling 54 along the support 20. Thus, if the core blade 16 may twist the molding angle junction 18 about the support 20, this twisting may cause the core lifter 16 to bind-up along the support 20.

In some core lifters, the core blade is pivotally mounted about a single axis for accommodating various molding angles between mold apparatus and, therefore, is capable to pivot and compensate for operating loads acting in a plane normal to this pivot axis (FIG. 3). However, there is a need to adequately compensate for operating loads acting transverse to this pivot plane, and as a result, the core blade 16 still may twist the molding angle junction 18 and cause it to bind-up along the support 20. Thus, there a desire for a new and improved universal core lifter that provides multiple axes compensation to allow the core blade 16 to pivot in multiple pivot planes to seat at different molding angles "A" and to compensate for operating loads transferred to the core blade from any direction.

Turning again to FIG. 1, there is depicted a preferred embodiment of the universal core lifter 10 that pivots about multiple axes to compensate for mold apparatus operating loads applied to the core blade 16 from any direction. The preferred core blade 16 is generally a rectangular metal shaft, but it can have a square, round or any other mold required profile. The core blade 16 is manufactured with a length which one can shorten down to a particular mold apparatus length. As seen in FIG. 4, the mold apparatus length "L" may be generally defined by the distance extending from the pin retainer plate 50 to and through the lower core plate 22.

Turning now to FIG. 2, the upper end 30 of the core blade 16 has a generally horizontally surface 60 intersecting the angled, vertical surface 32 to form a lower corner 61. The angled, vertical surface 32 continues upward at an angle from the vertical identical to the angle for the surface 34a of the undercut 34 to intersect the top surface 36 to form the edge 40. The molding of undercuts 34 with the upper end 30 machined with the angled, vertical surface 32 and the edge 40 requires the core blade 16 to move horizontally away from the undercut 34 to safely release the plastic part 14 during ejection in a straight vertical direction.

The core blade 16 has a lower end 56 with a curved dovetail heel 66 to be received in a cooperating curved dovetail 68 in a universal coupling 54 for pivotal mounting of the core blade 16. The lower end 56 includes on each left and right side 62a and 62b (FIG. 2) a recess wall 70 defined between an upper, horizontal sidewall 72 of the core blade 16 and a lower sidewall 74 of the dovetail heel 66. To assist in multiple axes pivoting, each of the lower sidewalls 74 has a partially-spherical, convex surface 75, and the core blade 16 has its bottom configured with a partially-spherical, concave surface 58 which mates with a cooperating partially-spherical, convex surface 64 on the universal coupling 54.

The universal coupling 54 has generally a H-shaped cross-section with a pair of spaced vertical sidewalls 80 connected by web 81. The web 81 has on top the partially-spherical, convex surface 64 and underneath a flat, horizontal surface 86. Each of the sidewalls 80 have an arcuate recess 78 with a flat recess surface 78a defined between a partially-spherical, concave surface 76 and the partially-spherical, convex surface 64.

When the curved dovetail heel 66 is received in the curved dovetail 68, the partially-spherical, convex surfaces 75 of the lower sidewalls 74 on the curve dovetail heel 66 and the partially-spherical, concave surfaces 76 of the sidewalls 80 on the curved dovetail 68 are engaged for sliding movement as the core blade 16 pivots during opening and closing of the mold. The curved dovetail heel 66 has on each side an outer surface 100, and clearance is provided between these outer surfaces 100 and the flat recess surface 78a of each corresponding recess 78 in the sidewalls 80 so they are not always engaged in sliding contact. Clearance is also provided between a flat wall portion 81 that extends upward from the partially-spherical surfaces 76 of each sidewall 80 of the universal coupling 54 and corresponding recess walls 70 on the lower end 56 of the core blade 16. These clearances allow the core blade 16 to pivot toward the sidewalls 80 for multiple axes pivoting.

Turning again to FIG. 1, the partially-spherical, concave surface 58 on the core blade's lower end 56 cooperately engages with the partially-spherical, convex surface 64 on the web 81 for smooth sliding between the core blade 16 and the universal coupling 54. The partially-spherical, concave surface 58 of the core blade 16 is configured substantially similar to the partially-spherical, convex surface 64 of the universal coupling 54 to allow the core blade 16 to pivot in a range of angles about multiple axes. As mold operating loads are transferred through the core blade 16 to the universal coupling 54, the partially-spherical surfaces 58 and 64 cooperate to provide a smooth pivoting junction enabling the core blade 16 to pivot instantaneously and continuously in other planes outside the first vertical plane (FIG. 3) used primarily for seating the core blade 16 at the molding angle "A." Also, it is found that these partially-spherical surfaces 58 and 64 provide a pivot junction that uses large mating surface areas, compared to dowel pin or a ball and socket joints, and is able to transfer the operating loads through to the support 20 without harmful concentration found in using these alternative joints which rapidly wear.

During the closing of the mold halves 22 and 24, the partially-spherical, convex dovetail surfaces 75 of the dovetail heel 66 and the partially-spherical, concave surfaces 76 of the side walls 80 on the universal coupling 54 are wide surfaces that are engaged to carry the load for pulling downward the core blade 16. During the opening of the mold halves 22 and 24 for ejecting the plastic part 14, the partially-spherical, concave surface 58 and the partially-spherical, convex surface 64 are also wide surfaces that are engaged to carry the load to force upward the core blade 16. The partially-spherical surfaces 58 and 64 slide relative to each other in any direction to provide the multiple axes pivoting feature of the present invention. That is, the core blade 16 can pivot about multiple axes to compensate for loads transferred to the lifter transverse to the primary pivot plane used for seating the core blade 16 at the molding angle "A." This multi-axes pivoting prevents the core blade 16 from cocking and twisting the universal coupling 54 about the support 20 and, thus, assists in preventing the universal coupling 54 from binding up along the support 20.

Referring again to FIG. 2, the universal coupling 54 has a standard linear dovetail 82 for receiving a standard, linear T-gib 84 on the support 20. The flat, horizontal surface 86 on the universal coupling 54 mates with a flat, horizontal surface 88 on the support 20. The flat, horizontal surfaces 86 and 88 provide for smooth movement of the universal coupling 54 along the support 20 and, further, provide an effective transfer of the operating loads to the support 20 because of their wide mating surface areas. The support 20 can be different lengths depending on the amount of linear travel required for the universal coupling 54 to move for maintaining the core blade 16 at the molding angle "A." The support 20 is attached to the ejector plate 52 by threaded bolts 90 (FIG. 5) into cooperating threaded bores 92 (FIG. 5) in the bottom of the support 20.

In operation, the mold apparatus 12 opens by raising the upper cavity plate 24, as seen in FIG. 5, and ejects the plastic part 14 by raising the ejector plate 52. The ejector plate 52, consequently, raises the ejector pin plate 50 with its ejector pins 42 and, also, the universal core lifter 10. At this same time, the core blade's lower end 56 translates linearly along the T-gib 84 of the support 20. This upward movement of the core lifter 10 forces the core blade 16 and its back and front surfaces 44a and 44b over the core plate guide surfaces 46a and 46b. This moves the edge 40 and the angled, vertical surface 32 of the upper end 30 horizontally away from the surface 34a of the undercut 34 of the plastic part 14. The pin retainer plate 50 travels upward "X" distance to eject the plastic part 14, and as a result, the upper end 30 moves "Y" distance horizontally away from the undercut 34. This "Y" distance is typically found to be less than ⅛", but it depends on the function and configuration of the desired undercut of each particular plastic part.

More specifically, as the core lifter 10 is raised, the universal coupling 54 moves left along the T-gib 84 of the support 20 as shown in FIG. 5, and when the ejector plate 52 moves downwardly, it pulls the support 20 down, and the linear dovetail 82 act to pull the universal coupling 54 to withdraw the core blade 16 by the engagement of the core blade's curved dovetail heel 66 in the curved dovetail 68 of the universal coupling 54. The core blade 16 is withdrawn through the core plate 22 and down to position its upper end 30 for molding the next plastic part as shown in FIG. 4.

In many mold apparatus, the core blade 16 extends upward from the universal coupling 54 and through an opening 94 in the pin retainer plate 50 and, then, through an opening 96 in the core support plate 48. In some mold apparatus, the core support plate 48 is omitted in favor of a thicker lower core plate 22. When the mold apparatus 12 closes for molding, as seen in FIG. 4, the back and front blade surfaces 44a and 44b are abutting the inclined core plate guide surfaces 46a and 46b, respectively, and the top surface 36, edge 40, and surface 32 of the core blade's upper end 30 become part of the internal cavity shape 28. The internal cavity 28 is now defined by the cavity plate 24, lower core plate 22 and the upper end 30 of the core blade 16.

This raising and lower of the core lifter 10 and the sliding of the core blade 16 over the guide surfaces 46a and 46b of the lower core plate 22 places operating loads on the core lifter 16 when the mold is opened for plastic part 14 ejecting and closed for plastic part 14 molding. The molding components are known not to always be aligned and/or are known to be susceptible to wear and other loads. Consequently, it is important during the molding operation that the core blade 16 pivot about multiple axes at the lower end 56 simultaneously and continuously. By pivoting about multiple axes, the core blade 16 is prevented from twisting the universal coupling 54 about the support 20 and, therefore, prevents the universal coupling 54 from binding-up and, hence, permits it to travel smoothly and freely along the support 20.

Turning now to FIG. 7, there is illustrated an alternative embodiment utilizing the features of the present invention. An alternative core blade 116 has a lower end 156 with a curved dovetail heel 166 to be received in a cooperating curved dovetail 168 in an alternative universal coupling 154 for pivotal mounting of the core blade 116. To assist in multiple axes pivoting, the core blade 116 at its lower end 156 is pivotally mounted to the universal coupling 154 by incorporating the features, including the surfaces and any clearances therebetween, employed to join the core blade 16 at its lower end 56 to the universal coupling 54 (FIG. 2), except that the heel 166 of the core blade 116 has its bottom configured with a partially-spherical, convex surface 158. This partially-spherical, convex surface 158 mates with a cooperating partially-spherical, concave surface 164 on the universal coupling 154. The difference being that the heel 66 of the core blade 16 has a partially-spherical, concave surface 58 mating with a partially-spherical, convex surface 64 on the universal coupling 54 as shown in FIG. 2.

Additionally illustrated in FIG. 7, the universal coupling 154 may have a two piece construction having an upper half 200 and a lower half 202. The two halves 200 and 202 are mated together along a horizontal extending parting line 204 and are secured together in a conventional manner.

Alternatively shown in FIG. 8, the universal coupling 154 may have a two piece construction having a left half 206 and a right half 208. These two halves 206 and 208 are mated together along a vertical extending parting line 210 and are secured together in a conventional manner.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A mold for molding plastic parts, comprising:
   a first mold half having surfaces defining a portion of a mold cavity;
   a second, ejector, mold half having surfaces defining a portion of the mold cavity;
   the first and second mold halves being movable between a closed position to mold the plastic part and an open position in which the first and second mold halves are spaced to eject the plastic part; and
   a universal internal core blade lifter having an end with a surface cooperating with the mold halves surfaces in molding the plastic part and disposed at a predetermined angle to the vertical;
   a core blade on the lifter having the surface to cooperate with the ejector mold half to mold the plastic part and having an opposite end pivotally mounted;
   the core blade surface movable laterally away from an undercut on the plastic part and in a direction to assist in ejection of the plastic part;
   a coupling on the lifter pivotally mounting the opposite end of the core blade to pivot in a first plane;
   a support for mounting the coupling to the second mold half and mounting the coupling for linear travel to move the opposite end of the core blade in a linear path as the first and second mold halves move between the open and closed positions; and
   curved surfaces on the core blade and on the coupling including dovetail surfaces interengaged to pivot the core blade about multiple axes to compensate for loads applied from directions transverse to the first plane when the mold halves shift between open and closed positions for the lifter to travel freely along the support and to be used in other molds at an angle other than the predetermined angle.

2. An internal core lifter apparatus for use with a plurality of molds, each requiring the apparatus to be disposed at different angles, the apparatus comprising:
   a core blade with a first end configured by an end user to cooperate with a mold to mold a plastic part having an undercut and to be movable in an ejection direction to assist in ejecting the part, and an opposite end pivotally mounted;
   a coupling pivotally mounting the core blade at the opposite end for pivoting about multiple axes in multiple planes including at least in a first plane about at least one axis for seating the core blade at a mold specific angle for assisting in part ejection; and
   a support mounted to an ejector plate, the support having a sliding surface on which the opposite end travels linearly, and curved surfaces on the core blade and on the coupling including dovetail surfaces interengaged for pivoting the second end of the core blade about multiple axes.

3. An internal core lifter apparatus for use with a plurality of molds and being disposed at different angles in different molds, the apparatus comprising:
   a core blade having a first end configured to cooperate with a mold to mold a plastic part and pivoted to turn in a first plane as the part is ejected;
   a universal coupling including a curved, spherical surface section mated with a curved, spherical surface section on a second end of the core blade to pivot the core blade in the first plane and in multiple planes at angles to the first plane;
   an ejector means in the mold for ejecting the plastic part;
   the first end of the core blade movable in an ejecting direction to assist in ejecting the plastic part from the mold; and
   a support being mounted to the ejector means and having a sliding surface across which the universal coupling slides with uninhibited linear travel while the first end of the core blade moves relative to the plastic part when the mold opens and pivots in the first plane and in multiple planes at angles to the first plane as needed.

4. An internal core lifter in accordance with claim 3 wherein the universal coupling includes an upper curved dovetail for pulling the core blade during closing of the mold.

5. An internal core lifter in accordance with claim 3 wherein the second end has a heel with a partially-spherical, concave surface for mating with a partially-spherical, convex surface on the universal coupling for sliding to pivot the core blade about multiple axes.

6. An internal core lifter in accordance with claim 3 wherein the second end has a heel with a partially-spherical, convex surface for mating with a partially-spherical, concave surface on the universal coupling for sliding to pivot the core blade about multiple axes.

7. An internal core lifter in accordance with claim 3 wherein the universal coupling has a linear dovetail guided by the support plate to move the second end linearly for ejecting the plastic part and a curved dovetail cooperating with the core blade.

8. An internal core lifter in accordance with claim 3 wherein the universal coupling comprises a first half and a second half being secured together.

9. An internal core lifter apparatus for use with a plurality of molds having mold halves and for being disposed at different angles in each mold, the apparatus comprising:
   a core blade with an end configured for molding a plastic part having an undercut and an opposite end having a dovetail heel with a partially-spherical, concave surface for transmitting and receiving both pushing and pulling forces;
   a universal coupling for providing multiple axes pivoting and linear movement having a first lower dovetail with a partially-spherical, convex surface for receiving and mating the partially-spherical, concave surface on the dovetail heel of the core blade;
   the first lower dovetail for pivoting the core blade through a plurality of angles in the mold, the end configured for molding moving laterally away from the undercut and assisting in ejecting the plastic part;
   a second upper curved dovetail formed by curved surfaces on the heel of the core blade and on the universal coupling; and
   a support being mounted to the mold having a linear dovetail surface for linear movement of the universal coupling along the support and the first dovetail providing for multiple axes pivoting of the core blade for assisting in uninhibited linear travel of the universal coupling along the support.

* * * * *